United States Patent
Balakrishnan et al.

(10) Patent No.: US 7,778,253 B2
(45) Date of Patent: Aug. 17, 2010

(54) DATA SWITCH, AND COMMUNICATION SYSTEM USING THE DATA SWITCH

(75) Inventors: Prashant Balakrishnan, Singapore (SG); Guruprasad Ardhanari, Singapore (SG)

(73) Assignee: Infineon Technologies AG, Munich (DE)

( * ) Notice: Subject to any disclaimer, the term of this patent is extended or adjusted under 35 U.S.C. 154(b) by 900 days.

(21) Appl. No.: 11/364,740

(22) Filed: Feb. 28, 2006

(65) Prior Publication Data

US 2006/0146819 A1   Jul. 6, 2006

Related U.S. Application Data

(63) Continuation of application No. PCT/SG03/00199, filed on Aug. 29, 2003.

(51) Int. Cl.
*H04L 12/28* (2006.01)
(52) U.S. Cl. ................... 370/395.7; 370/395.31
(58) Field of Classification Search ........... 370/389, 370/401; 711/108, 216, 221, 170–173
See application file for complete search history.

(56) References Cited

U.S. PATENT DOCUMENTS

| | | | | |
|---|---|---|---|---|
| 5,815,500 A | | 9/1998 | Murono | |
| 5,914,938 A | * | 6/1999 | Brady et al. | 370/254 |
| 6,094,435 A | * | 7/2000 | Hoffman et al. | 370/414 |
| 6,256,314 B1 | * | 7/2001 | Rodrig et al. | 370/401 |
| 6,473,846 B1 | * | 10/2002 | Melchior | 711/170 |
| 6,678,269 B1 | * | 1/2004 | Michels et al. | 370/389 |
| 2002/0067733 A1 | | 6/2002 | Stoeckl et al. | |
| 2002/0116527 A1 | | 8/2002 | Chen et al. | |
| 2003/0147385 A1 | * | 8/2003 | Montalvo et al. | 370/389 |
| 2004/0085958 A1 | * | 5/2004 | Oman | 370/389 |

* cited by examiner

*Primary Examiner*—Chirag G Shah
*Assistant Examiner*—Jenkey Van
(74) *Attorney, Agent, or Firm*—Slater & Matsil, L.L.P.

(57) ABSTRACT

A preferred embodiment comprising a data switch includes a first processor for routing data packets including a MAC address, using a MAC address table stored in a writable memory. The switch further includes a second processor for routing data packets including an IP address using an IP address look-up table stored in the writable memory. The writable memory consists of a single memory fabric that is allocated between the MAC address table and the look-up table by a memory control unit according to a setting stored in a non-erasable memory unit.

22 Claims, 3 Drawing Sheets

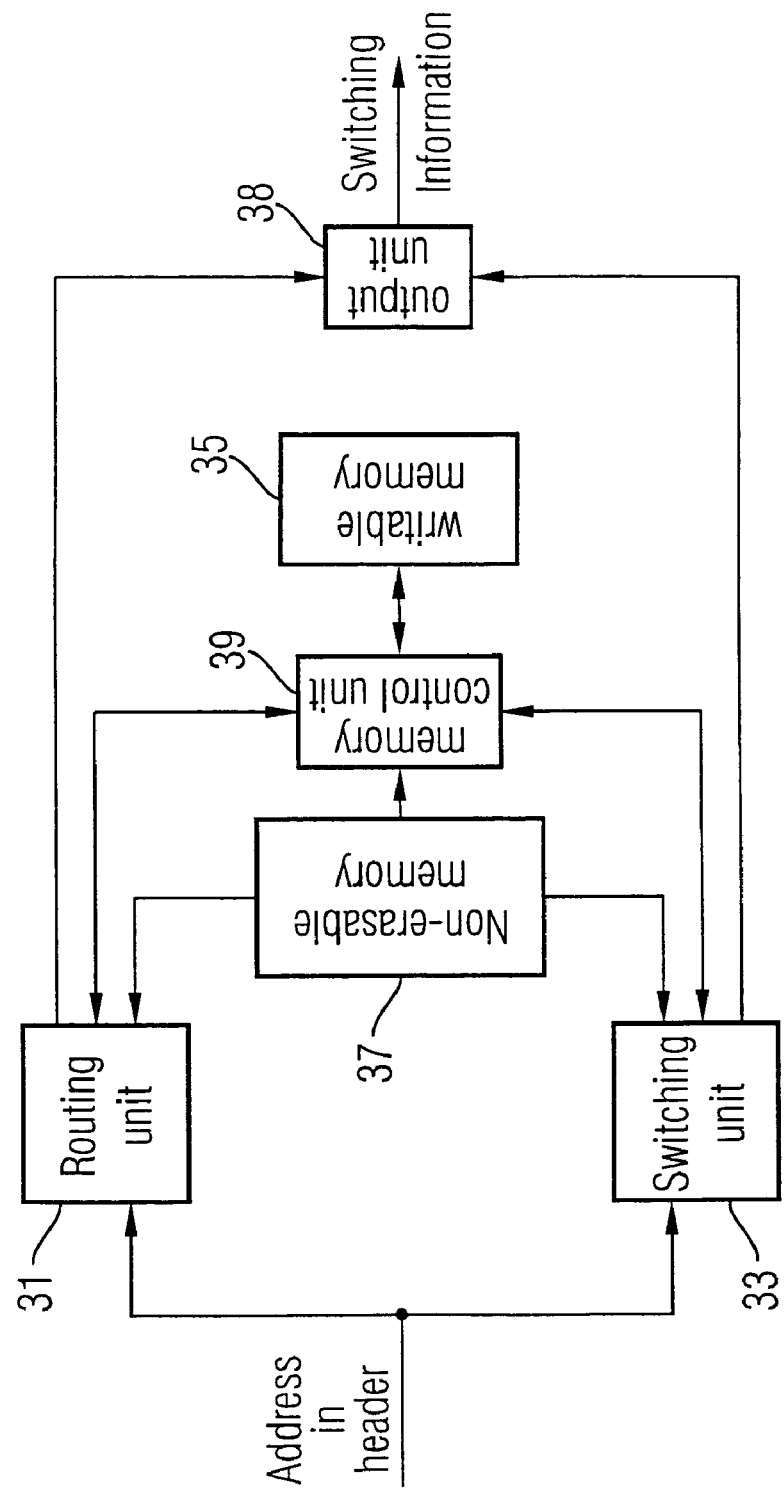

DATA SWITCH, AND COMMUNICATION SYSTEM USING THE DATA SWITCH

This application is a continuation of co-pending International Application No. PCT/SG2003/000199, filed Aug. 29, 2003, which designated the United States and was published in English, which application is incorporated herein by reference.

TECHNICAL FIELD

Embodiments of the present invention relate to a data switch for switching data packets between its ports, and to a communication system employing the data switch.

BACKGROUND

A local address network (LAN) conventionally includes at least one Ethernet data switch that provides a "bridging" function of routing data packets generated by computer systems attached to the LAN to other computer systems attached to the LAN (i.e., switching within the LAN itself). The switch has ports connected to the various computer systems of the LAN, and learns an association between its ports and the respective MAC (media access control) addresses of the computer systems, so that when a given packet arrives specifying the MAC address of one of the computer systems, the switch can use the association to direct the packet to the computer system via the corresponding port. To learn the association, the switch includes a MAC address table.

For this purpose, the switch performs the method shown in FIG. 1a. During the learning phase, when it is required to store switching data for a given 48-bit MAC address, the 48-bit MAC address 1 is input to a hash function 3, which uses it to output 5 an n-bit address. The address is input to each of m buckets 7, that is a writable segment of a memory 9 referred to as a MAC address table. Each bucket consists of a number of rows, and each row stores data in the format shown in FIG. 1b: a valid bit, control info, and a space for a 48-bit MAC address to be stored. The address generated by the hashing algorithm 3 for any given MAC address is n bits long, and selects one of the rows in each of the m buckets 7. When a MAC address is to be learned the switch checks the data stored in each of the m buckets in turn to determine if the row of the bucket corresponding to the MAC address is free (i.e., no MAC address is stored there already). If it finds one that is free, it stores there the MAC address that is being learned, and also stores there the control information the switch needs to direct data packets to having this MAC address in the header (e.g., the number of the corresponding port). The total memory used by the MAC address table 9 is thus the number m of buckets 7 times the number ($2^n$) of rows per bucket 7 times the number of bits that are stored per bucket 7.

During a data packing switching phase, the switch determines the MAC address in the header of the data packet, again inputs this address 1 to the hash function 3 to obtain the n-bit address, and checks the m buckets 7 in turn using m comparators 11 to see whether a MAC address stored there is equal to the one in the header of the data packet. If so, the control information is output, so that the data packet can be switched using it.

It is also well known to provide a router that connects the LAN to the Internet. This router ("IP router") has to perform IP routing, in which packets received by the router from the Internet are examined to identify whether a first section of the header of the packet (the "network identifier" portion) indicates that the packet is intended for the LAN. Only in this case, the router would examine further sections of the header of the packet (the "station identifier" portion) to identify which station on the LAN the packet was intended for. Note that within the 32-bit IP address, the network and station identifiers can be of variable lengths. Thus, the IP address 172.120.14.15 with a network identifier 172.120.14 is not the same IP address as 172.120.14.15 where the network identifier is 172.120.

The algorithm performed by the IP router is illustrated in FIG. 2a. The 32-bit IP address is broken into 32/p groups of p-bits each. Each group in turn is used to access a respective one of 32/p sections 13 of a "lookup table" 15. Each section 13, when it receives the corresponding group of bits, outputs a string 17 of w bits. The bits are passed as inputs to a respective one of a set of w AND units 19. The AND units 19 output their result to a respective flip-flop 21, which passes its output back to the corresponding AND unit 19. The outputs of the flip-flops 21 are initialized to "1" before the look-up. Thus, after all 32/p groups have been used in turn, the outputs of the flip-flops 23 will only be 1 if the output of the corresponding bit of the memory 15 was 1 for each of the groups. The outputs of the set of flip-flops 23 at this stage is a set of w bits. As explained below, one or more of these w bits may have the value 1, and of these bits the least significant is extracted by a priority encoder 25. The output of the priority encoder 25 is an address in an IP address table 27 having a depth of w. The information stored in the IP address table 27 can be used to determine the final destination of the packet. The typical structure of an item in the IP address table is shown in FIG. 2b. It contains control information and a destination port.

It is possible that there will be multiple matches (i.e., more than one of the w bits input to the priority encoder 25 will be 1). The look-up table 15 is programmed such that the addresses with the longest prefix matches are the lower significant columns of the look-up memory. Thus, in the case of multiple matches, the priority encoder 25 can choose the match with the longest prefix simply by choosing the column number on the least significant side. Thus, a router will assume an address match, even if only a few bits in the most significant portion of the 32-bit IP address match an entry in its table.

Normally, the number of IP addresses supported by an IP switch is on the order of thousands, so it may not be possible to have a single memory for the lookup-table. In this case, the lookup table may be broken down into a number of smaller memories s, each of width q, such that s×q=w.

As hardware became cheaper, smarter and faster, it has been possible to realize a significant portion of the router software routines in hardware, thus making the routers faster and more intelligent. The next logical step was to integrate IP routers and MAC-address based bridging switches to achieve higher levels of integration and thus reduce costs. These devices herein are called "layer 3 switches" to emphasize the difference between these devices and traditional layer 2 switches (in some literature, layer 3 switches are called "swooters", i.e., switches plus routers).

Presently new applications for Ethernet are emerging, such as so-called "Ethernet in the first mile" (EFM), in which home users use Ethernet to connect to the Internet. Another new Ethernet application is digital subscriber line access multiplexers (DSLAMs), which provide functions such as permitting high-speed data transmission over existing copper telephone cables, separating voice-frequency signals from high-speed data traffic, and routing digital subscriber line (xDSL) traffic between the subscriber's end-user equipment and the network service provider's network.

To cater for all these applications, layer 3 switches have to cater for two different markets: the office market, in which the layer 3 switches need to do a lot of bridging and very little routing, and the home market, in which layer 3 switches do a lot of routing and very little, if any, bridging.

SUMMARY OF THE INVENTION

Embodiments of the present invention provide a new and useful layer 3 switch device, and a communications system incorporating it.

Embodiments of the invention are motivated by the observation that, if a layer 3 switch is provided with separate writable memory for IP routing and MAC switching, and if each of these look-up functions is implemented in a separate memory, then a great deal of memory will be wasted in either of the two markets described above. In the office market, the memory for the IP routing will be little used, and in the home market the memory for the MAC switching will be little used.

In general terms, embodiments of the invention propose that the layer 3 switch should contain a writable (RAM) memory that is accessed both by the IP routing unit and the MAC switching unit. Thus, the memory requirements of the two routing/switching can both be implemented, provided that the total memory requirement does not exceed that of the writable memory, using a writable memory having a size only about as large as the expected total memory requirement of the two functions.

Specifically, one embodiment of the invention is a data switch for switching packets including a header that includes a MAC address or an IP address, the switch including a writable memory unit, a MAC address switching unit for using a MAC address table stored in the writable memory to obtain switching information based on the MAC address in the header of a packet, an IP address switching unit for using an IP address look-up table stored in the writable memory to obtain switching information based on the IP address in the header of a packet, and a memory control unit for controlling the allocation of writable memory between the IP address look-up table and the MAC address table.

The switching information may, for example, include a port to which the packet should be directed. The implementation of how the switching is done, once the switching information is obtained may be as in conventional systems.

In further aspects of the invention a communication system is proposed that includes such a data switch.

BRIEF DESCRIPTION OF THE DRAWINGS

An embodiment of the invention will now be described, by way of example, with reference to the accompanying drawings in which, FIG. 1, which is composed of FIGS. 1a and 1b, illustrates a MAC operation performed in a known device;

FIG. 3 is a schematic view of an embodiment of the invention.

DETAILED DESCRIPTION OF ILLUSTRATIVE EMBODIMENTS

Figure 1A:
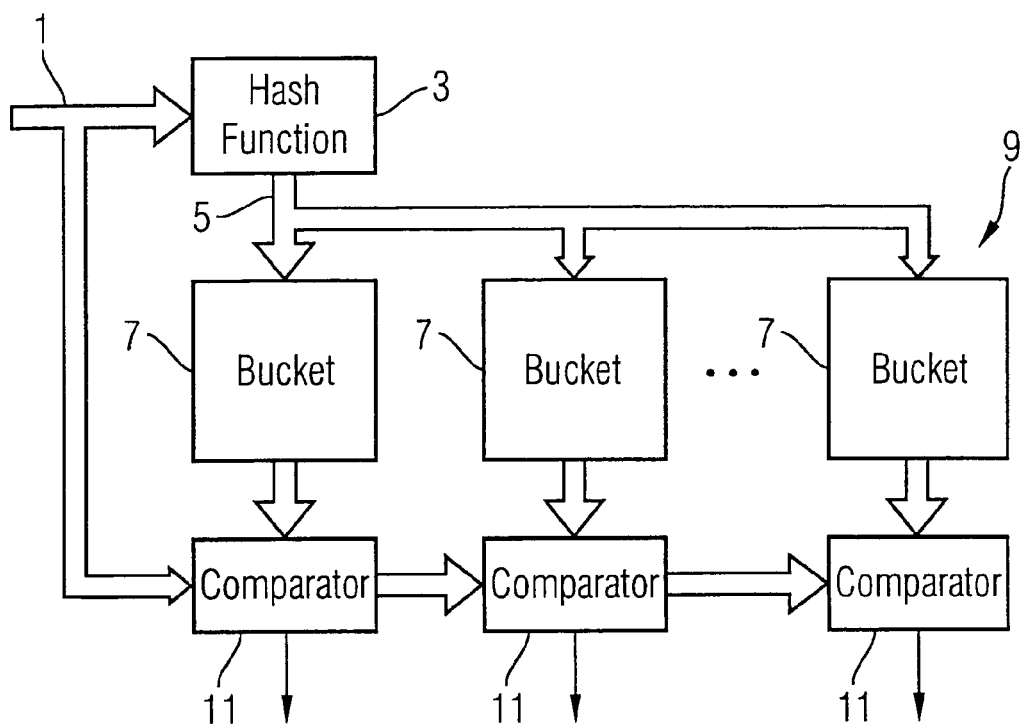
Figure 1B:
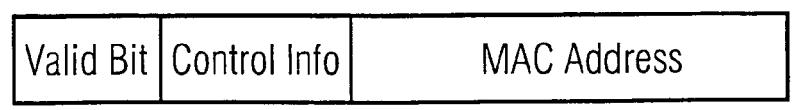
Figure 2A:
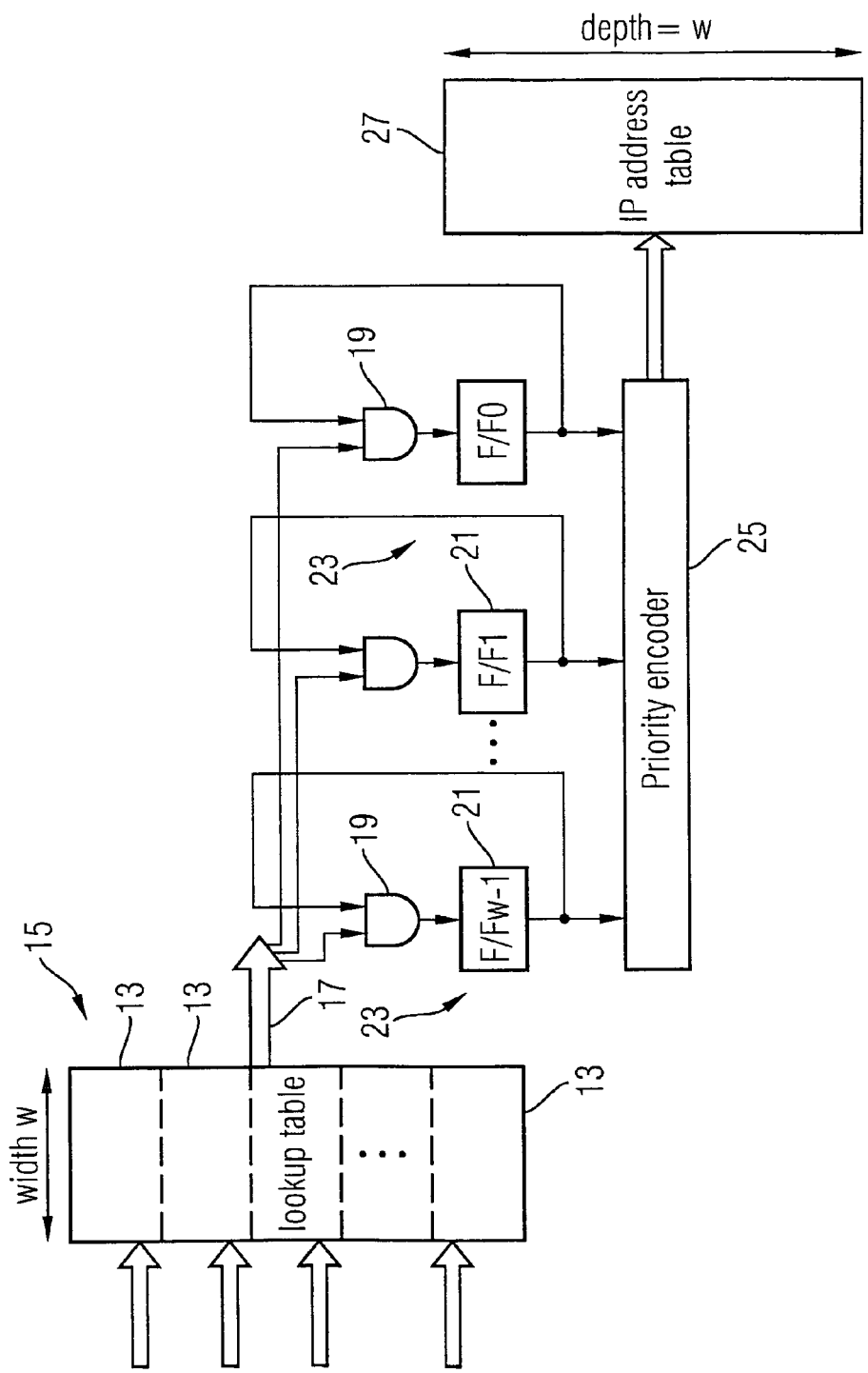
FIG. 2, which is composed of FIGS. 2a and 2b, illustrates an IP lookup operation performed in a known device.
Figure 2B:

A preferred embodiment uses the methods explained above with reference to FIGS. 1 and 2, but sharing the memory, which is used for storing the MAC address table 9 and the look-up table 15. The embodiment is preferably a layer 3 Ethernet switch, and the maximum and minimum number of MAC addresses, and the maximum and minimum number of IP addresses, which should be supported in a layer 3 switch is specified as part of the specification. Within these requirements the user has flexibility to choose the configurations required, and hence a significant amount of memory can be saved by selecting the proportions of the total writable memory, which are employed by the switching and the routing respectively.

The overall structure of the embodiment is shown in FIG. 3. The layer 3 switch includes a first processing unit (IP routing unit) 31 for routing packets having an IP address using an IP address look-up table 15 stored in a writable memory 35. The IP routing unit 31 further includes a memory (not shown) for storing the IP address table 27. The layer 3 switch further includes a second processing unit (MAC switching unit) 33 for switching data packets having a MAC address in the header portion using a MAC address table 9, which also is stored in the writable memory 35. The writable memory consists of a single memory fabric that is allocated between the MAC address table and the look-up table according to a setting stored in a non-erasable memory 37. The proportions of the writable memory 35, which are allocated to the two processing units 31, 33, and all other details of the configuration of the memory usage, are stored by the non-erasable memory 37. The non-erasable memory 37 is selected to be non-erasable so that the configuration is fixed on reset, and cannot be changed on the fly.

Preferably, the system further includes a memory control unit 39, which is supplied with the output of the non-erasable memory 37, and, which implements the memory sharing. It can do this, as explained below, such that the IP router unit 31 can be implemented exactly as in FIG. 2, and the MAC switching unit 33 can be implemented exactly as in FIG. 3, with only the sizes of the MAC address table 9 and the look-up table 15 varying according to the data stored in the non-erasable memory 37.

Specifically, the IP routing unit 31 needs to read data from or write data to an address in the look-up table 15, it sends a corresponding instruction to the memory control unit 39, including an address in the look-up table 15. The memory control unit 39 uses the address in the look-up table 15 to determine the corresponding location in the writable memory 35, and implements the instruction on that memory location. Similarly, when the MAC switching unit 33 wants to read data from or write data to an address in the MAC address table 9, it sends a corresponding instruction to the memory control unit 39, including an address in the MAC address table 9. The memory control unit 39 receives the instruction from the MAC switching unit and value in the non-erasable memory 37 to determine the corresponding location in the writable memory 35, and implements the instruction on that memory location.

The writable memory may be implemented as a plurality of memories that together form a single big address space. In this case, the memory control unit 39 may select one of these memories and send a shorter address to it because physically these memories are small.

Note that variation in the size of the MAC address table 9 implies that the depth of the buckets 7 varies, not the number of buckets m, which is determined by the specification. By contrast, variation in the size of the look-up table 15 implies that the width w of the memory varies, not the depth of the look-up table 15, which again is determined by the specification. This means that the memory control unit 39 will always receive address strings of the same length from the IP routing unit 31. By contrast, when the size of the MAC address table 9 varies, the length of the addresses from the MAC switching unit 33 will vary. Thus, according to the size of the MAC address table 9 within the writable memory 35, the memory and address that will be selected vary.

Note that although the memory control unit 39 is illustrated as a separate unit in FIG. 3, this is only one possibility, and in principle its functionality can be split and incorporated into the units 31, 33.

The system further includes an output unit 38, which receives the outputs of both the IP routing unit 31 and the MAC switching unit 33. If, upon a given packet being interpreted by the units 31, 33, only one of the units 31, 33 generates switching instructions, then the output unit 38 transmits those instructions. By contrast, if both the units 31, 33 generate switching instructions, the output unit 38 may or may not transmit the output of unit 33 depending on the instruction from the unit 31. Thus, the routing instructions generally are prioritized over the switching instructions.

With some restrictions on the size and number of memories used, and the number of configurations allowed, formulas can be derived to calculate the number and size of the memories used to support the selected configuration. The calculation of the configuration parameters is now given. Suppose that:
1) the maximum number of MAC addresses is Mmax
2) the maximum number of IP addresses is Imax
3) the minimum number of MAC addresses is Mmin
4) the minimum number of IP addresses is Imin
5) the number of cycles for IP lookup is c, plus two cycles for priority encoding and reading the IP address table respectively, where c is a power of 2 and is not more than 32
6) the number of buckets for MAC lookup is m, as defined above
7) the width of the bucket in the MAC table (i.e., the MAC address itself and the control information) is q.

Furthermore, assume that the width of the memories for IP lookup is the same as the width of the buckets used for the MAC table lookup (i.e., q), and that the depth d of the memories for IP lookup is equal to the depth D of the memories used for MAC table lookup.

With these assumptions, the value of p, that is the number of bits into which the 32-bit IP address is broken down to derive groups for insertion into the table, is 32/c, and the values of d and D are both equal to $c \times 2^p = c \times 2^{32/c}$.

Thus, the total number of memories that can be used for MAC table lookup, M can be written as:

$$M = m \times \left\lceil \frac{M\max}{m \times d} \right\rceil = m \times \left\lceil \frac{M\max}{m \times c \times 2^{32/c}} \right\rceil. \quad (1)$$

The total number of memories which can be used for IP lookup, I, is $$I = \left\lceil \frac{I\max}{q} \right\rceil. \quad (2)$$

The number of memories for dedicated MAC look-up:

$$m \times \left\lceil \frac{M\min}{m \times d} \right\rceil = m \times \left\lceil \frac{M\min}{m \times c \times 2^{32/c}} \right\rceil. \quad (3)$$

The number of memories for dedicated IP lookup is $$I = \left\lceil \frac{I\min}{q} \right\rceil. \quad (4)$$

The number of memories for MAC lookup which can be made sharable is $$m \times \left\lceil \frac{M\max - M\min}{m \times d} \right\rceil = m \times \left\lceil \frac{M\max - M\min}{m \times c \times 2^{32/c}} \right\rceil.$$

The number of memories for IP lookup that can be made sharable is $$\left\lceil \frac{I\max - I\min}{q} \right\rceil$$

Hence, the actual number of sharable memories, S, is $$\left\lceil m \times \left\lceil \frac{M\max - M\min}{m \times c \times 2^{32/c}} \right\rceil, \left\lceil \frac{I\max - I\min}{q} \right\rceil \right\rceil.$$

If no wastage of memory space is desired in any configuration, the values of m, Mmax, Mmin, c, q, Imax and Imin should be chosen such that the two variables in the above equation are equal, the values of Mmax and Mmin being multiples of m and values of Imax and Imin being multiples of q. With these additional constraints, the configurations in Table 1 below are possible. The number of sharable memories that are used in the MAC table look-up are a multiple of m, since m memories (buckets) are always accessed for any MAC address lookup. The number of configurations C that are possible with memory sharing is calculated as

TABLE 1

List of configurations in which there is no memory wastage
C = ⌈S/m⌉

| Number of MAC addresses supported | Number of IP addresses supported |
|---|---|
| Mmax | Imin |
| M max − m × c × $2^{32/c}$ | Imin + m × q |
| M max − 2m × c × $2^{32/c}$ | Imin + 2 × m × q |
| . | . |
| . | . |
| . | . |
| M min + m × c × $2^{32/c}$ | Imax − m × q |
| M min | Imax |

Table 2 lists a particular realization of this scheme in the case of m=4, c=8, Mmin=Imin=0, q=64.

TABLE 2

| Number of MAC addresses supported | Number of IP addresses supported |
|---|---|
| 4.5K | 0 |
| 4K | 256 |
| 3.5K | 0.5k |
| 3K | 768 |
| 2.5K | 1K |
| 2K | 1280 |

TABLE 2-continued

| Number of MAC addresses supported | Number of IP addresses supported |
|---|---|
|  | 1.5K |
| 1K | 1792 |
| 0.5K | 2K |
| 0 | 2304 |

Although only a limited number of embodiments of the invention has been described above, many variations are possible within the scope of the invention as will be clear to a skilled reader. For example, although the embodiment is described as having "units" it is to be understood that this does not imply separate integrated circuit items. Although that would be one possible implementation of the invention, preferably the entire layer 3 switch is implemented as a single integrated circuit, in which the "units" referenced above are different circuitry sections of the integrated circuit.

What is claimed is:

1. A data switch for switching packets including a header that includes at least one of a MAC address and an IP address, the switch comprising:
   a writable memory unit;
   a MAC address switching unit for using a MAC address table stored in the writable memory unit to obtain switching information based on the MAC address in the header of a packet;
   an IP address switching unit for using an IP address look-up table stored in the writable memory unit to obtain switching information based on the IP address in the header of a packet; and
   a memory control unit for controlling allocation of writable memory between the IP address look-up table and the MAC address table, wherein controlling the allocation comprises controlling respective sizes of the IP address look-up table and the MAC address table based upon an application of the data switch.

2. The data switch according to claim 1, wherein the memory control unit comprises a control memory storing at least one parameter for controlling the allocation of the writable memory unit between the IP address look-up table and the MAC address table.

3. The data switch according to claim 2, wherein the control memory is arranged to store the at least one parameter without modification during operation of the data switch.

4. The data switch according to claim 1, wherein the memory control unit receives read/write instructions from the MAC address switching unit and the IP address switching unit, derives from them a corresponding location in the writable memory unit, and implements the instructions in those locations.

5. The data switch according to claim 4, wherein the memory control unit derives the corresponding location in the writable memory unit based on an address contained in the read/write instructions, the location depending on the size of the IP address lookup-table and the MAC address table.

6. A data switch comprising:
   a writable memory unit;
   a MAC address switching unit for using a MAC address table stored in the writable memory unit to obtain switching information based on a MAC address in a header of a packet;
   an IP address switching unit for using an IP address look-up table stored in the writable memory unit to obtain switching information based on an IP address in the header of a packet;
   a memory control unit for controlling allocation of writable memory between the IP address look-up table and the MAC address table and wherein controlling the allocation comprises
   controlling respective sizes of the IP address look-up table and the MAC address table based upon an application of the data switch; and
   controlling based upon at least one parameter selected from the group consisting of 1) a maximum number of MAC addresses, 2) a maximum number of IP addresses, 3) a minimum number of MAC addresses, 4) a minimum numbers of IP addresses, 5) a number of cycles for IP processing, 6) a number of buckets for MAC look-up, and 7) a width of a bucket in the MAC addresses table; and
   an output unit arranged to receive the switching information from the MAC address switching unit and the IP address switching unit.

7. The data switch according to claim 6, wherein when, from a given data packet, both the IP address switching unit and the MAC address switching unit generate switching information, the output unit operates according to the switching information generated by the IP address switching unit.

8. The data switch according to claim 6, wherein when, from a given data packet, only one of the IP address switching unit and the MAC address switching unit generates switching information, the output unit transmits the switching information.

9. The data switch according to claim 6, further comprising:
   when, from a given data packet, both the IP address switching unit and the MAC address switching unit generate switching information, the output unit operates according to the switching information generated by the IP address switching unit; and
   when, from a given data packet, only one of the IP address switching unit and the MAC address switching unit generates switching information, the output unit transmits the switching information.

10. The data switch according to claim 6, wherein the memory control unit comprises a control memory storing the at least one parameter for controlling the allocation of the writable memory between the IP address look-up table and the MAC address table.

11. The data switch according to claim 10, wherein the control memory is arranged to store the at least one parameter without modification during operation of the data switch.

12. The data switch according to claim 6, wherein the memory control unit receives read/write instructions from the MAC address switching unit and the IP address switching unit, derives from them a corresponding location in the writable memory unit, and implements the instructions in those locations.

13. The data switch according to claim 12, wherein the memory control unit derives the corresponding location in the writable memory unit based on an address contained in the read/write instructions, the location depending on the size of the IP address look-up table and the MAC address table.

14. A communication system comprising:
   a data switch comprising:
   a writable memory unit;
   a MAC address switching unit for using a MAC address table stored in the writable memory unit to obtain switching information based on a MAC address in a header of a packet;
   an IP address switching unit for using an IP address look-up table stored in the writable memory unit to obtain switching information based on an IP address in the header of a packet; and a memory control unit for controlling allocation of writable memory between the IP address look-up table and the MAC address table, wherein controlling the allocation comprises controlling respective sizes of the IP address look-up table and the MAC address table based upon an application of the data switch;

a plurality of computer systems connected to the data switch by a local area network; and a connection for connecting the data switch to the Internet.

15. The communication system according to claim 14, wherein when, from a given data packet, both the IP address switching unit and the MAC address switching unit generate switching information, an output unit operates according to the switching information generated by the IP address switching unit.

16. The communication system according to claim 14, wherein when, from a given data packet, only one of the IP address switching unit and the MAC address switching unit generates switching information, an output unit transmits the switching information.

17. The communication system according to claim 14, wherein the memory control unit comprises a control memory storing at least one parameter for controlling the allocation of the writable memory between the IP address look-up table and the MAC address table.

18. The communication system according to claim 17, wherein the control memory is arranged to store the at least one parameter without modification during operation of the data switch.

19. The communication system according to claim 14, wherein the memory control unit receives read/write instructions from the MAC address switching unit and the IP address switching unit, derives from them a corresponding location in the writable memory unit, and implements the instructions in those locations.

20. The communication system according to claim 19, wherein the memory control unit derives the corresponding location in the writable memory unit based on an address contained in the read/write instructions, the location depending on the size of the IP address look-up table and the MAC address table.

21. The data switch according to claim 1, wherein controlling the allocation comprises controlling based upon 1) a maximum number of MAC addresses, 2) a maximum number of IP addresses, 3) a minimum number of MAC addresses, 4) a minimum numbers of IP addresses, 5) a number of cycles for IP processing, 6) a number of buckets for MAC look-up, and 7) a width of a bucket in the MAC address table.

22. The data switch according to claim 6, wherein the at least one parameter comprises all of 1) the maximum number of MAC addresses, 2) the maximum number of IP addresses, 3) the minimum number of MAC addresses, 4) the minimum numbers of IP addresses, 5) the number of cycles for IP processing, 6) the number of buckets for MAC, and 7) the width of the bucket in the MAC table.

* * * * *